(12) United States Patent
Graves et al.

(10) Patent No.: US 10,837,571 B2
(45) Date of Patent: Nov. 17, 2020

(54) MECHANICAL SAFETY SHUT-DOWN VALVE

(71) Applicant: Acorn Engineering Company, City of Industry, CA (US)

(72) Inventors: James Graves, Libertyville, IL (US); Boris Quijada, Beach Park, IL (US)

(73) Assignee: Acorn Engineering Company, City of Industry, CA (US)

( * ) Notice: Subject to any disclaimer, the term of this patent is extended or adjusted under 35 U.S.C. 154(b) by 215 days.

(21) Appl. No.: 16/059,711

(22) Filed: Aug. 9, 2018

(65) Prior Publication Data

US 2020/0049272 A1 Feb. 13, 2020

(51) Int. Cl.
*F16K 31/00* (2006.01)
*F16K 17/04* (2006.01)
*F01P 7/16* (2006.01)
*F16K 11/10* (2006.01)

(52) U.S. Cl.
CPC .............. *F16K 31/002* (2013.01); *F01P 7/16* (2013.01); *F16K 11/105* (2013.01); *F16K 17/048* (2013.01)

(58) Field of Classification Search
CPC ...... F16K 31/002; F16K 17/003; F16K 17/38; F16K 17/383; F16K 11/105; F16K 17/048; F01P 7/16
USPC .............................. 137/457, 468, 485, 489.5
See application file for complete search history.

(56) References Cited

U.S. PATENT DOCUMENTS

| | | | | |
|---|---|---|---|---|
| 1,941,023 A | * | 12/1933 | Smith | F16K 17/003 236/92 C |
| 1,960,271 A | * | 5/1934 | Lovekin | F16K 17/003 137/73 |
| 1,976,022 A | * | 10/1934 | Hutchinson | F16K 31/002 169/20 |
| 2,232,502 A | * | 2/1941 | Wittmann | F16K 31/40 251/11 |
| 2,233,659 A | * | 3/1941 | Wittmann | F23N 5/025 137/65 |
| 2,351,190 A | * | 6/1944 | Carlson | F16K 17/003 236/92 C |
| 2,377,132 A | * | 5/1945 | Crowe | F16K 17/00 236/92 C |
| 2,598,351 A | * | 5/1952 | Carter | F16K 17/38 236/93 R |
| 2,649,114 A | * | 8/1953 | Wittmann | 251/11 |

(Continued)

FOREIGN PATENT DOCUMENTS

| | | | | |
|---|---|---|---|---|
| DE | 102018132180 A1 | * | 6/2019 | ........... F16K 31/402 |
| GB | 881132 A | * | 11/1961 | ........... G05D 23/022 |

OTHER PUBLICATIONS

Machine Translation of DE102018132180A1 retrieved May 2020. (Year: 2020).*

*Primary Examiner* — Jessica Cahill (74) *Attorney, Agent, or Firm* — Eric J. Sosenko; Jonathan P. O'Brien; Honigman LLP (57) ABSTRACT

A pilot valve controlled mechanical shut-down valve. The mechanical shut-down valve includes a thermostatic motor that effectuates closing of the pilot valve when the temperature of fluid flowing through the shut-down valve is one of greater than a predetermined value, less than a predetermined value, or within a range of predetermined values. As a result thereof, flow through the shut-down valve is stopped.

13 Claims, 8 Drawing Sheets

(56) References Cited

U.S. PATENT DOCUMENTS

| | | | | |
|---|---|---|---|---|
| 3,691,783 | A | * | 9/1972 | Proctor .................. F16K 17/38 |
| | | | | 62/212 |
| 3,822,563 | A | * | 7/1974 | Orth ..................... F25B 41/043 |
| | | | | 62/217 |
| 4,483,287 | A | | 11/1984 | Monigold et al. |
| 4,535,805 | A | * | 8/1985 | Mertz .................. F16K 31/402 |
| | | | | 137/489 |
| 4,590,999 | A | * | 5/1986 | Snaper .................. A62C 37/11 |
| | | | | 169/37 |
| 4,917,294 | A | * | 4/1990 | Bergmann .............. F16K 17/38 |
| | | | | 236/93 B |
| 5,738,276 | A | * | 4/1998 | Saur ....................... F16K 17/38 |
| | | | | 236/92 C |
| 7,117,895 | B2 | | 10/2006 | Koyama |
| 8,490,885 | B2 | | 7/2013 | Lamb et al. |
| 8,851,444 | B2 | | 10/2014 | Mesner |
| 2009/0007972 | A1 | * | 1/2009 | Lum ..................... G05D 23/02 |
| | | | | 137/468 |
| 2010/0043899 | A1 | * | 2/2010 | Evanno ................ F16K 31/124 |
| | | | | 137/637 |
| 2010/0126594 | A1 | | 5/2010 | Sheppard |
| 2014/0053921 | A1 | * | 2/2014 | Risse ..................... F16K 1/307 |
| | | | | 137/468 |
| 2014/0174545 | A1 | * | 6/2014 | Franz ..................... F16K 17/38 |
| | | | | 137/2 |

* cited by examiner

MECHANICAL SAFETY SHUT-DOWN VALVE

BACKGROUND

1. Field of the Invention

This present invention generally relates to fluid valves. More specifically, the present invention relates to fluid valves in which the fluid pressure is used to control the flow through the valve and which further have a shut-down mechanism dependent on a characteristic of the fluid flow.

2. Description of Related Technology

Conventional shut-down valves use a pressure chamber to control the flow determining valve. Fluid flows into and fills the pressure chamber through a fixed orifice. A pilot valve with a variable sized orifice allows fluid to leave the chamber and determines the pressure inside the chamber. The size of the variable orifice is controlled by an electrical or pneumatic operated activator. Eliminate the need for external connections and associated electrical or pneumatic activators would be beneficial.

SUMMARY OF THE INVENTION

A pilot valve controlled mechanical shut-down valve is disclosed herein. The mechanical shut-down valve includes a thermostatic motor that effectuates closing of the pilot valve when the temperature of fluid flowing through the shut-down valve is one of greater than a predetermined value, less than a predetermined value, or within a range of predetermined values. As a result, the flow of fluid through the shut-down valve is stopped.

According to one aspect of the invention, mechanical shut-down valve is provided.

In another aspect, the shut-down valve includes a valve body having a bore extending from an inlet to an outlet and through which fluid may flow; a main valve located in the bore, the main valve comprising a valve wall defining a valve seat and a valve member, the valve member moveable between a closed position in engagement with the valve seat and preventing flow through the bore and an open position in disengagement with the valve seat and permitting flow through the bore; a reservoir chamber provided in the valve body and being partially defined by the valve member; a thermostatic motor assembly coupled to the valve body, the thermostatic motor assembly including a motor housing defining a sensing chamber and a thermostatic motor located in the sensing chamber, the sensing chamber being in fluid communication with the reservoir chamber and the thermostatic motor being configured to axially change in length in response to temperature changes in the sensing chamber; a pilot valve defining a variable-size orifice in a fluid pathway communicating the reservoir chamber with the bore, the pilot valve being moveable between defining a fully closed position and a fully open position of the variable-sized orifice, the pilot valve being operative coupled to the thermostatic motor whereby the variable-size orifice is varied in size in response to temperature changes in the sensing chamber; and wherein when the variable-size orifice is in the fully closed position an increase in fluid pressure is effectuated in the reservoir chamber causing movement of the valve member into the closed position.

In a further aspect, the valve member is a flexible diaphragm.

In yet another aspect, a bleed orifice is provided fluid communication from the bore into the reservoir chamber.

In an additional aspect, the bleed orifice in unobstructed.

In still another aspect, the bleed orifice is provided through the valve member.

In a further aspect, the sensing chamber is in open fluid communication with the reservoir chamber.

In yet an additional aspect, the pilot valve is cooperatively defined by portions attached to the thermostatic motor assembly and portions of the valve body.

In still a further aspect, the portions of the valve body define a valve seat.

In another aspect, the portions attached to the thermostatic motor assembly include a bumper moveable with the thermostatic motor assembly.

In a further aspect, the valve wall is defined by the valve body.

In an additional aspect, the bore includes an inlet portion on a side of the main valve communicating with the inlet and includes an outlet portion on an opposing side of the main valve communicating with the outlet.

In still another aspect, a valve orifice is defined centrally within the valve seat.

In yet a further aspect, the valve orifice is circumscribed by the inlet portion of the bore.

In addition to the exemplary aspects and embodiments described above, further aspects and embodiments will become apparent by reference to the drawings and by study of the following description.

DETAILED DESCRIPTION

Figure 1:
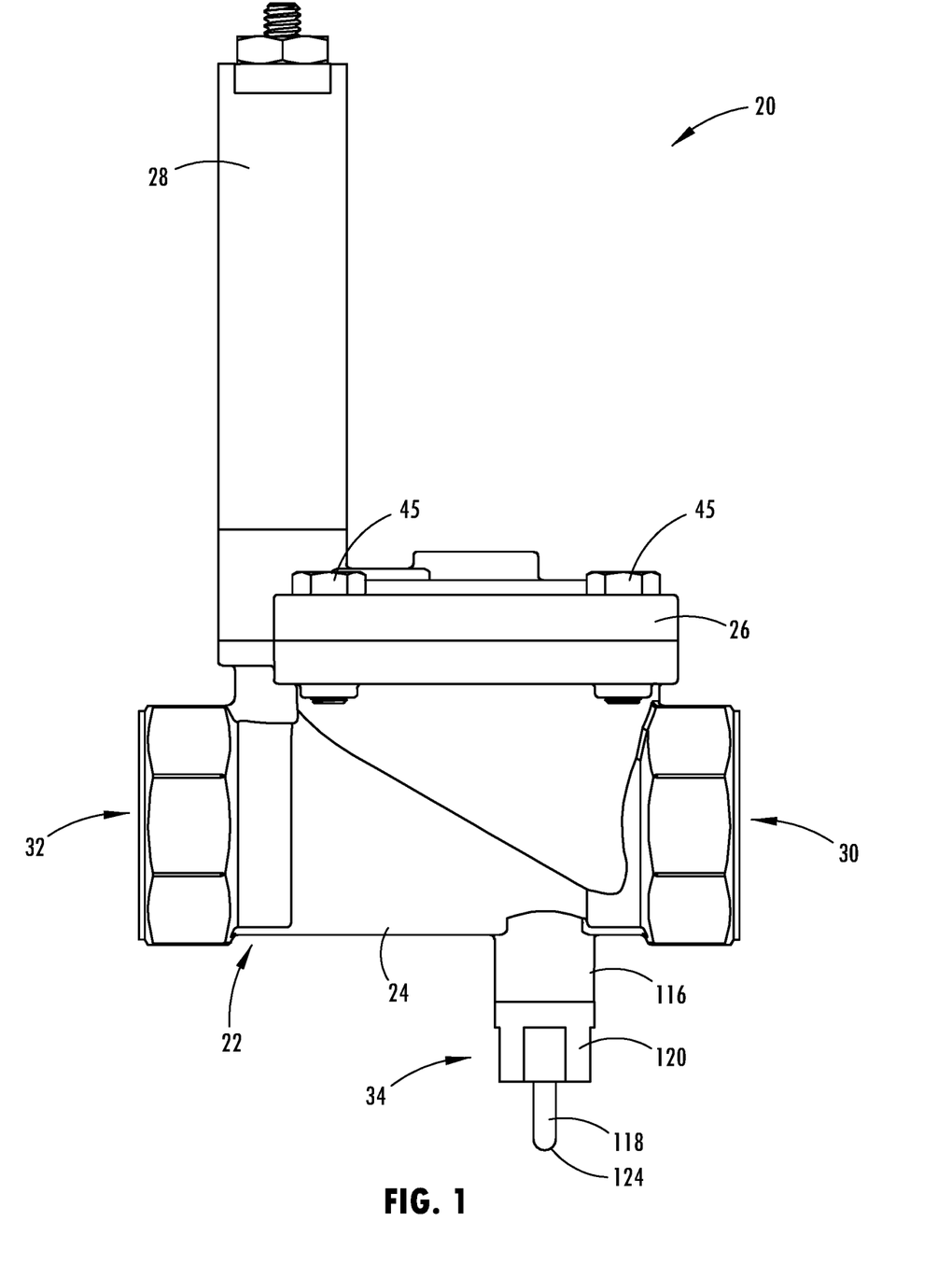
FIG. 1 is a side view of a shut-down valve embodying the principles of the present invention.

Referring now to the drawings, a mechanical shut-down valve, hereafter just "shut-down valve," is illustrated in FIG. 1 and generally designated at 20. As shown therein, the shut-down valve 20 includes a valve body assembly 22, a motor assembly 27 and, optionally, a plunger assembly 34.

Figure 2:
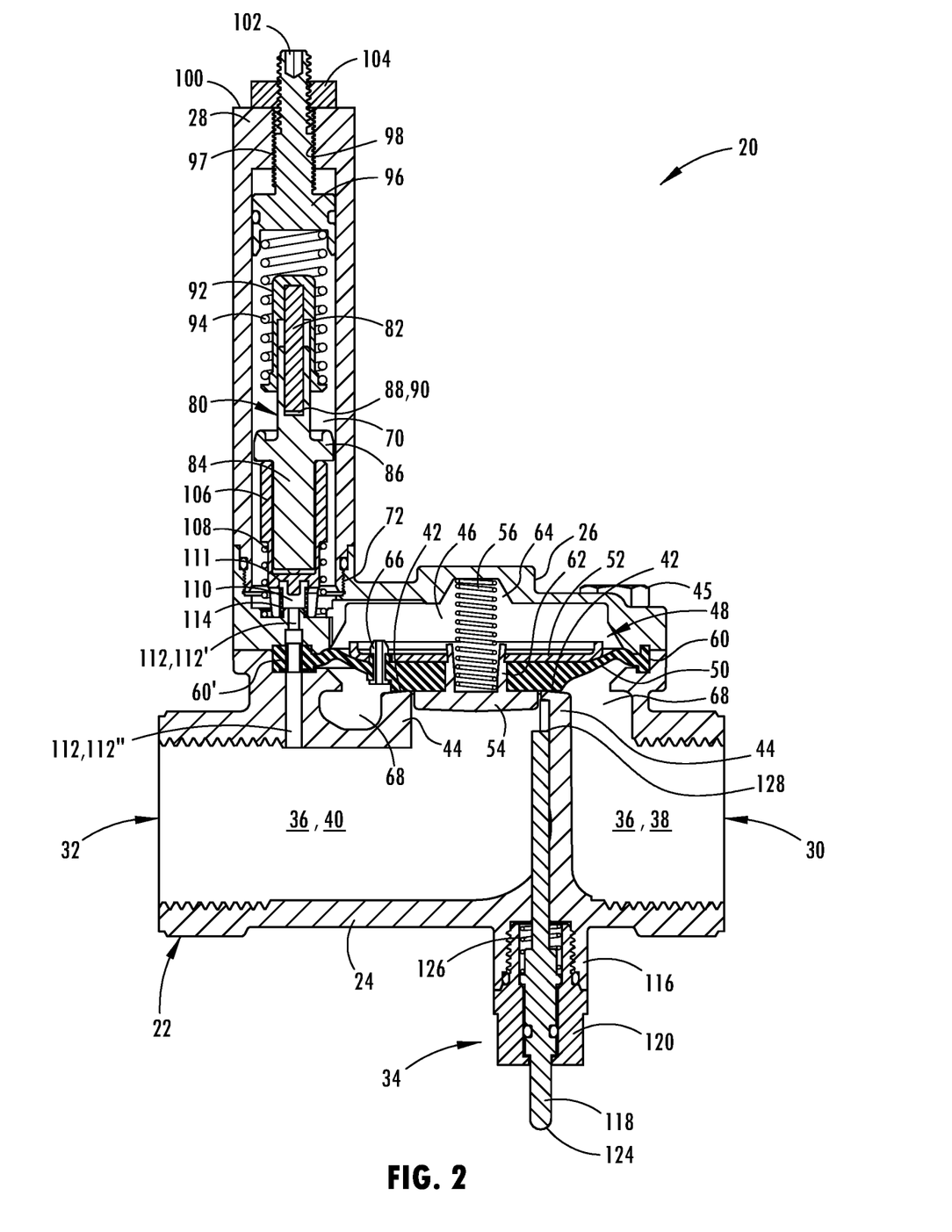
FIG. 2 is a cross-sectional view of the shut-down valve of FIG. 1 in a closed position.

The valve body assembly 22 further includes a valve base 24, a valve cover 26, an inlet port 30, and an outlet port 32. As seen in FIG. 2, a main bore 36 extends through the valve body 22 from the inlet port 30 to the outlet port 32. The main bore 36 is further segmented into an inlet bore 38 and outlet bore 40, generally defined on opposite sides of a valve seat 42, which is itself defined by end surfaces of an annular interior wall 44 of the valve base 24.

Figure 5:
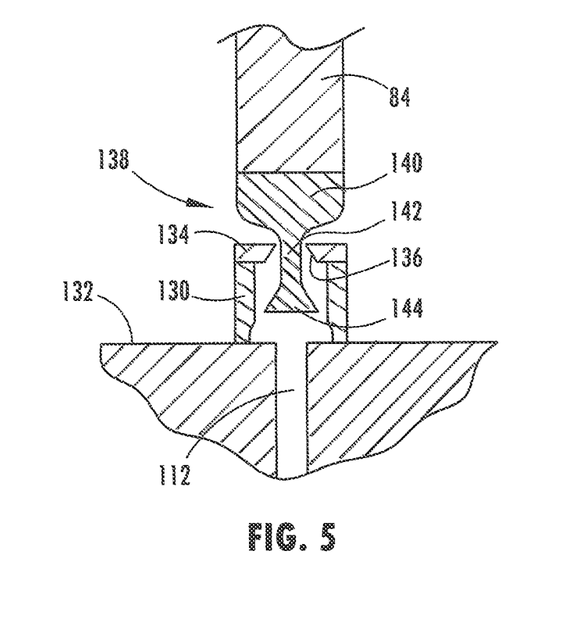
FIG. 5 is a diagrammatic cross-sectional illustration of a cold sensitive pilot valve in an open position.

The valve cover 26 is secured to the valve base 24 by fasteners 45, such as threaded fasteners as seen in FIG. 5. Cooperating with the valve base 24, the valve cover 26 defines a reservoir chamber 46 within the valve body 22. The reservoir chamber 46 is separated from the main bore 36 by a primary valve 48, of which the valve seat 42 forms a part. Other components of the primary valve 48 include a flexible diaphragm 50, a diaphragm plate 52, a diaphragm guide 54 and a biasing member 56, such as a coil spring.

The diaphragm 50 is formed of a flexible resilient material and is configured to engage the valve seat 42 so as to seal off the inlet bore 38 from the outlet bore 40. To retain the diaphragm 50 within the valve body 22, the perimeter 58 of the diaphragm 50 is captively restrained in a groove 60 defined between the valve cover 26 and the valve base 24.

The diaphragm guide 54 is generally centrally provided on the diaphragm 50 and is configured to guide the diaphragm 50 into proper engagement with the valve seat 42 by journaling within the opening into the outlet bore 40 defined by the valve seat 42 and interior wall 44. For this reason, the diaphragm guide 54 protrudes from the lower surface of the diaphragm 50 ("lower" being a directional reference to the orientation of shut-down valve shown in FIG. 2, in other words, toward the bottom of the page). On its rear side, the diaphragm guide 54 may include a boss 62 that extends completely or partially through the diaphragm 50 and engages the diaphragm plate 52, located on the opposing side of the diaphragm 50 from the diaphragm guide 54.

Figure 3:
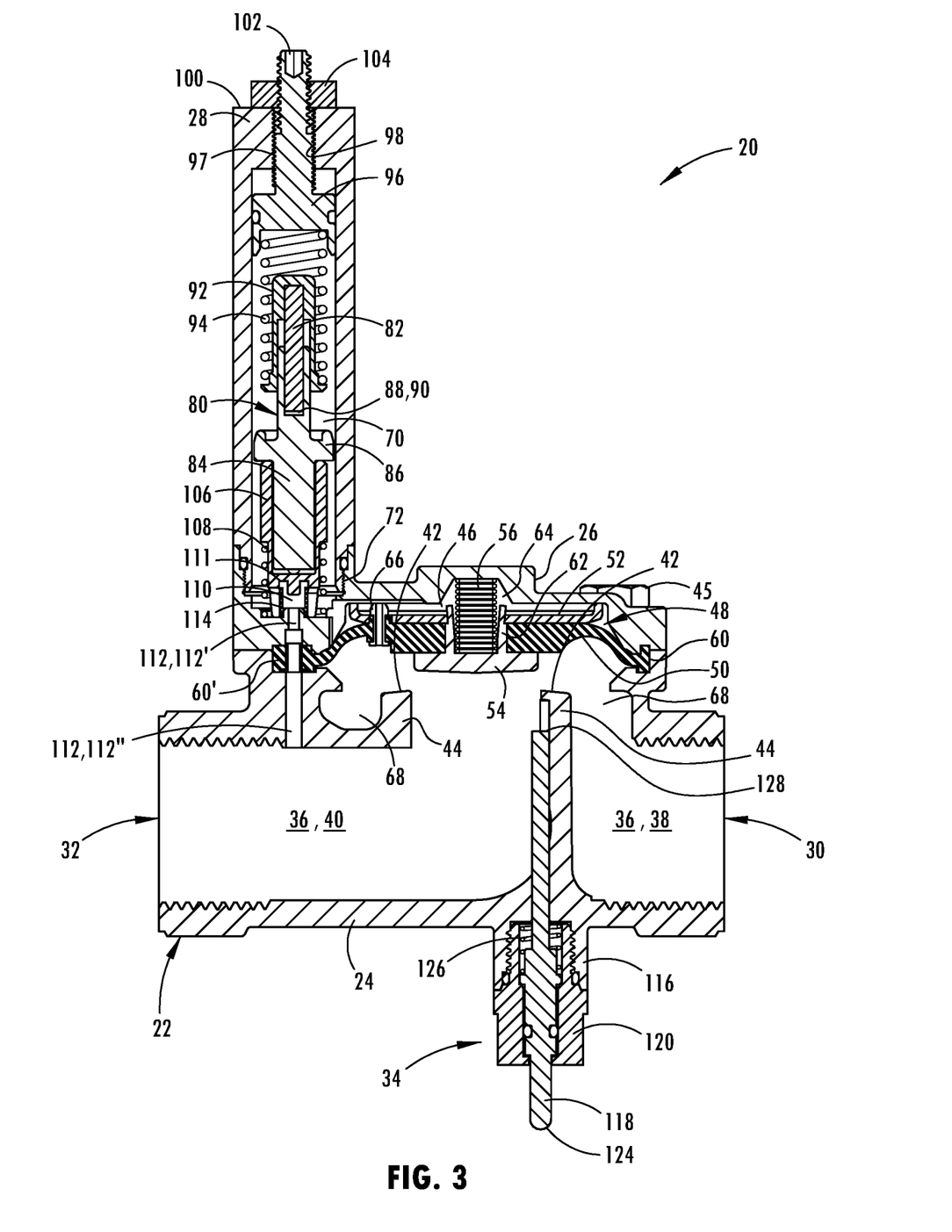
FIG. 3 is a cross-sectional view similar to that of FIG. 2, but illustrating the shut-down valve in an open position.

The diaphragm plate 52 is a structure that functionally provides rigidity structure to the diaphragm 50 so as to ensure adequate sealing contact with the valve seat 42, preventing fluid flow from the inlet bore 38 to the outlet bore 40 when the primary valve 48 is in the closed position of FIG. 2, versus the open position of FIG. 3.

Seated within the boss 62 of the diaphragm guide 54 is one end of a biasing member 56. The opposing end of the biasing member 56 is seated within a recess 64 formed in the valve cover 26. Being mounted between these two structures, the biasing member 56 exerts a biasing force on the diaphragm 50 and urges the diaphragm 50 into engagement with the valve seat 42 against the pressure of the fluid in the inlet bore 38.

Figure 4A:
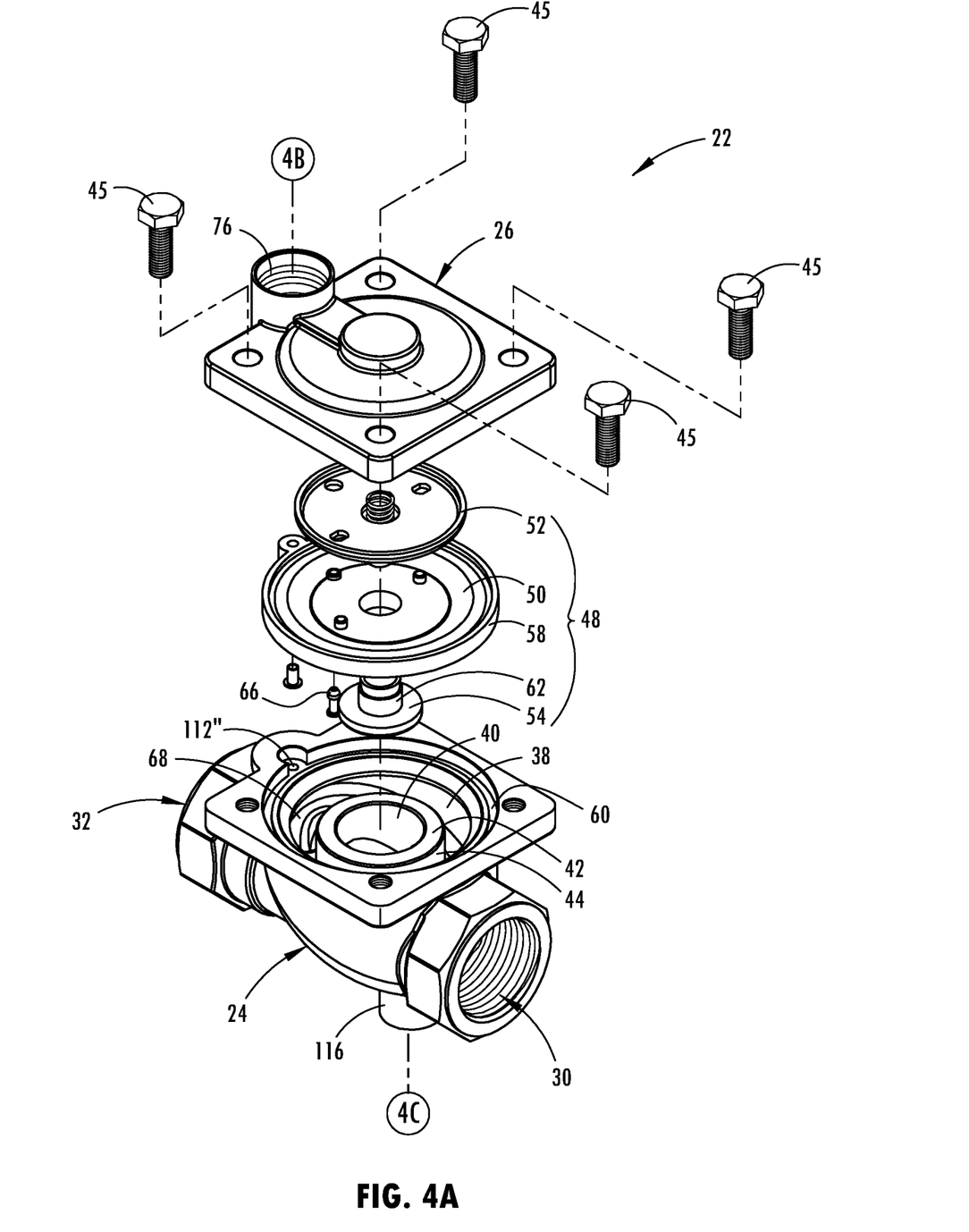
FIGS. 4A-4C cooperatively illustrate an exploded view of the shut-down valve seen in FIG. 1, including the motor assembly in FIG. 4B, the valve body in FIG. 4A and the plunger assembly in FIG. 4C, and which includes a hot sensitive pilot valve configuration.

The primary valve 48 also includes at least one bleed nozzle 66. The bleed nozzle 66 provide for continuous fluid communication between the inlet bore 38 and the reservoir chamber 46. Also for this purpose, the terminal portion of the inlet bore 38 is formed as a distribution chamber 68, which is located radially about the interior wall 44 and the valve seat 42. Locations for three bleed nozzles are seen in FIG. 4A.

The bleed nozzles 66 extend through the diaphragm 50 and diaphragm plate 52 at spaced apart locations that align with the distribution channel 68. The bleed nozzles 66 may be constructed as simple, small-diameter conduits, of metal or plastic, extending through the diaphragm 50 and the diaphragm plate 52. If desired or necessary, the conduits forming the bleed nozzles 66 may be fixedly secured to the diaphragm plate 52 by adhesive or other means.

Figure 4B:
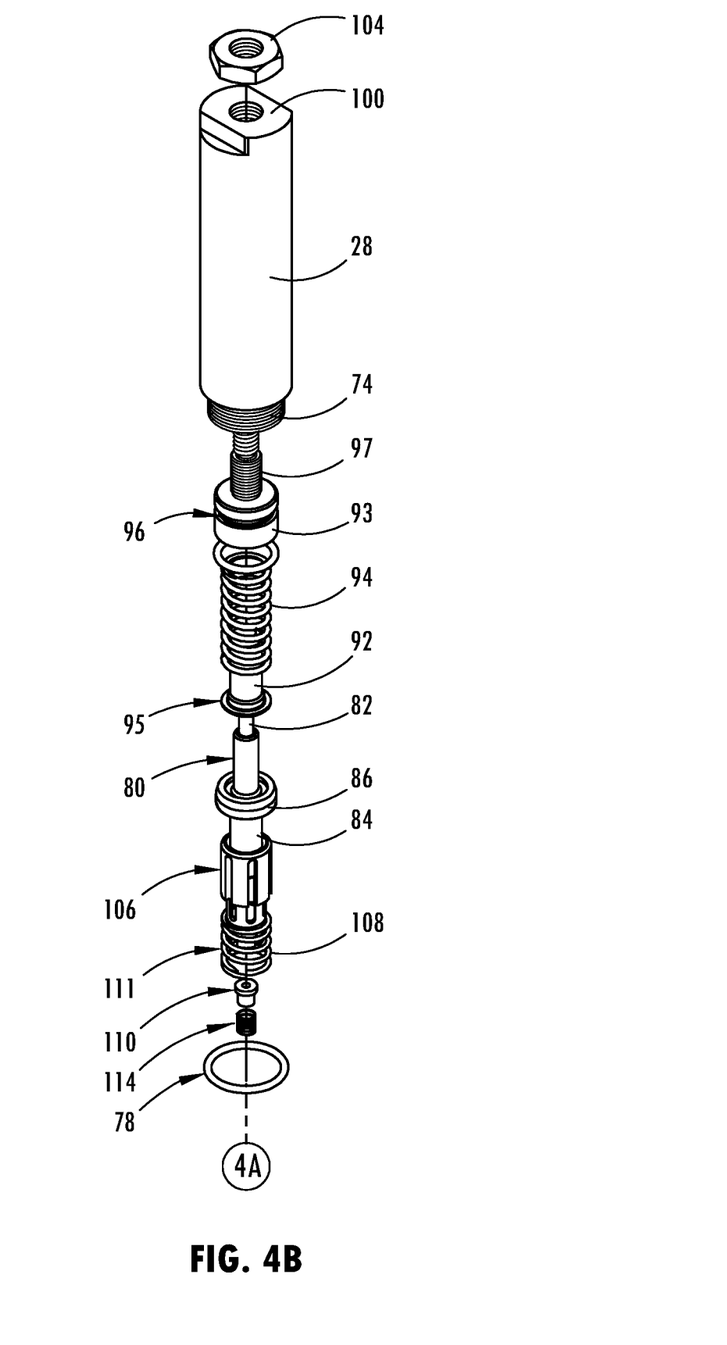

Further referring to FIGS. 2, 3 and 4B, the motor assembly 27 is secured to the valve cover 26 through a threaded engagement formed between a threaded portion 74 on one end of a motor cylinder 28 and a correspondingly threaded portion of 76 of the valve cover 26. A sealing member 78, such as an O-ring, is preferably provided between the interface of the lower end of the motor cylinder and the valve cover 26, adjacent to the threaded portions 74, 76, to ensure a fluid tight engagement of the motor assembly 27 with the valve body assembly 24.

Interiorly, the motor cylinder 28 defines a sensing chamber 70 that is in permanent fluid communication with the reservoir chamber 46. This permanent fluid communication is provided by port 72, which is seen as being defined in the valve cover 26.

Retained within the sensing chamber 70 is a thermostatic motor 80. Depending on the configuration of the thermostatic motor 80, the thermostatic motor 80 can be configured to initiate opening or closing of the primary valve 48. For example, in one configuration, upon sensing that the temperature of the fluid flowing through the shut-down valve 20 exceeds a predetermined temperature, the thermostatic motor assembly 80 initiates closing of the primary valve 48. Alternatively, the thermostatic motor assembly 80 may be configured to sense that the temperature of the fluid flowing through the shut-down valve 20 is too cold and below a predetermined temperature, resulting in opening of the primary valve 48. In yet a further alternative configuration, the thermostatic motor assembly may be configured to close the primary valve 48 upon sensing the temperature of the fluid flowing through the shut-down valve 20 is either above a first predetermined temperature or below a second predetermined temperature, which is different from the first predetermined temperature. In still a further alternative configuration, the thermostatic motor assembly 80 may be configured to throttle the flow of fluid based on temperature. This would be achieved by including a needle plunger (not shown) that moves in and out of pilot bore 112 (discussed below) so as to allow the primary valve 48 to float in a partially open/closed position.

Fluid flows from the reservoir chamber 46 through the port 72 and into the sensing chamber 70 where the fluid surrounds the thermostatic motor 80. As best seen in FIGS. 2 and 3, the thermostatic motor 80 is preferably a wax motor and includes a motor stem 82 and a motor body 84. The stem 82 is received within an upper portion of a motor body 84 such that an upper portion of the stem 82 extends from the body 84. A chamber 88, defined interiorly between a lower end of the motor stem 82 and a portion of the wax motor body 84, includes a temperature sensitive motive means, which in a preferred embodiment is a wax 90. Depending on the temperature of the fluid surrounding the thermostatic motor 80, the wax 90 expands or contracts. As a result, the motor stem 82 and motor body 84 move relative to one another, either lengthening or shortening the overall length of the thermostatic motor 80.

The upper end of the thermostatic motor 80 is received within an upper holder 92. More specifically, both the upper end of the body 84 and the portion of the stem 82 extending from the body 84 are received within the upper holder 92.

The upper holder 92 engages an upper spring 94 position between the upper holder 92 and an adjustment stem 96. In this regard, the upper holder 92 is provided with a radial flange 95 that engages a lower end of the spring 94, which may be a coil spring. The upper end of the spring 94 is received within a socket 93 of the adjustment stem 96.

The adjustment stem 96 includes external threads 97 that engage internal threads of a bore 98 extending through an end wall 100 of the motor cylinder 28. Thus, by rotating the adjustment stem 96 relative to the motor cylinder 28, a varying force can be exerted by the upper spring 94 upon the thermostatic motor 80. Rotation of the adjustment stem 96 is facilitated by a rotational drive feature 102 (e.g. a hex socket) formed in the end of the adjustment stem 96. To fix the position of the adjustment stem 96 relative to the motor cylinder 28, a locking nut 104 may be received on external threads of the adjustment stem 96 that are positioned exteriorly of the motor cylinder 28. Once the desired position of the adjustment stem 96 relative to the motor cylinder 28 is set, tightening of the locking nut 104 against the end wall 100 will fixedly retain the position.

The lower end of the motor body 84 is received within a lower holder 106. Preferably, an upper end of the lower holder 106 abuts against a shoulder 86 extending circumferentially around the motor body 84. The lower holder 106 is biased upward by a lower spring 108, which is positioned between a shoulder of the lower holder 106 and a portion of the valve cover 24 to which the motor cylinder 28 is mounted.

A bumper 110 is mounted to the lower end 111 of the lower holder 106, and a pilot bore 112, coaxial with the thermostatic motor 80, extends through the valve cover 24 (designated at 112') and the valve body 22 (designated at 112"). Together, the bumper 110 and pilot bore 112 operate as the pilot valve of the shut-down valve 20.

As seen in FIGS. 2, 3 and 4A, the pilot bore 112 defines a fluid communication passageway from the sensing chamber 70 to the outlet bore 40. The bumper assembly 80 is configured so that it either maintains an opening into the pilot bore 112 and permits fluid flow therein from the sensing chamber 70 and the reservoir chamber 46, prevents fluid communication there between or regulated the flow therebetween. For example, the bumper 108 may be biased as seen in FIGS. 2, 3 and 4B, in a direction away from the pilot bore 112 and toward the thermostatic motor 80, by a bumper spring 114. This configuration is intended to close the shut-down valve 20 in the event of the temperature exceeding a desired value, as further described below.

Figure 4C:
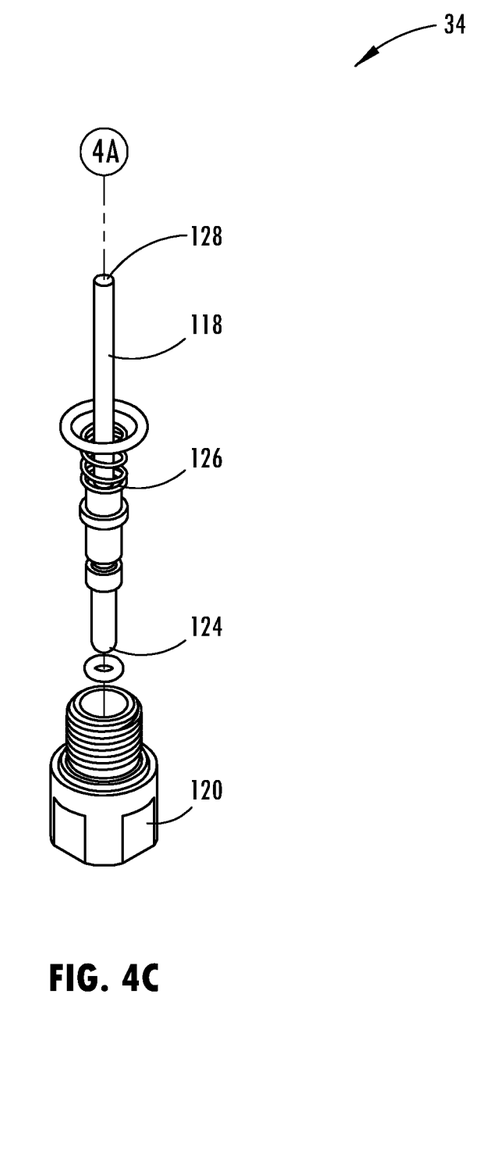

Also seen in FIGS. 1-4C is the optional plunger assembly 34. The plunger assembly 34 is used to manually open the primary valve 48 by displacing the diaphragm 50 from the valve seat 42. As best seen in FIG. 4C, the plunger assembly 34 includes a plunger rod 118 supported within a plunger cap 120 that is threadably engaged in plunger port 116 integrally formed with the valve body 24. One end of the plunger rod 118, the activation end 124, extends through the 120 to the exterior of the shut-down valve 20. The activated end 26 of the plunger rod 118 extends through a bore in the valve body 24 into the bore outlet 40 so as to be located generally along a side of the interior wall 44. Also position within the plunger port 116 is a spring 126. The spring 126, plunger rod 118, plunger cap 120 and plunger port 116 are configured so that that the spring 126 biases the plunger rod 118 in a direction away from the primary valve 48.

Upon depressing the activation end 124 against the bias of the spring 126, the activated end 126 is moved to a position where it engages an opposing surface of the diaphragm guide 54. Further movement of the plunger rod 118 causes the diaphragm guide 54, and therefore the diaphragm 50, to move upwardly, resulting in the diaphragm 50 disengaging from the valve seat 42 and permitting the communicating of fluid from the inlet bore 38 through the distribution chamber 68, about the interior wall 44, to the outlet bore 40. When the plunger assembly 34 is not provided with the shut-down valve 20, the plunger port 116 in which it would be received is closed off with a threaded plug (not shown).

Under normal operation, the opening (or alternatively closing) of the primary valve 48 is automatically achieved via the pressure of the flow in the system. The thermostatic motor 80 and its incorporation into the shut-down valve 20 allow for a characteristic of the flow to be monitored, herein temperature, and allow for either the opening or closing of the valve if the temperature of the flow is not in accordance with a preset value or range of values, without requiring electronic sensors or actuators.

Referring now to FIGS. 2 and 3, as seen in FIG. 3, the shut-down valve 20 is in typical open flow condition, where the temperature of the flow is normal operating temperature and below a predetermined operating temperature. In this state, a flow of fluid, water, is received at the inlet bore 28 and flows into the distribution chamber 68. The primary valve 48 is open because the pressure and temperature of the flow are sufficient and within the normal operating ranges. Accordingly, the pressure on the diaphragm 50 via the distribution chamber is greater than the pressure in the reservoir chamber and is sufficient to bias the diaphragm 50 against the spring 56 and disengage the diaphragm from the valve seat 42. Also, the temperature of the flow is such that the thermostatic motor 80 is in a retracted position allowing the bumper 110 to be biased away from the pilot bore 112 and permitting a flow out of the reservoir chamber 46 that is greater than the flow into the reservoir chamber 46 via the bleed nozzles 66, thereby contributing to a lower pressure in the reservoir chamber 46.

If the temperature of the flow exceeds a predetermined value, the temperature of the flow reaching the sensing chamber 70 will cause the wax 90 within the thermostatic motor 80 to expand, thereby lengthening the thermostatic motor 80. This in turn will case downward displacement of the bumper 110, eventually closing off fluid communication between the pilot bore 112' and the reservoir chamber 46. With this fluid communication closed off, fluid pressure within the reservoir chamber 46 will equalize with fluid pressure in the distribution chamber 68, allowing the biasing force of the spring 56 acting on the diaphragm 50 to move the diaphragm 50 into engagement with the seat 42. As a result, flow through the shut-down valve 20 will be stopped.

Upon the temperature of the flow returning to temperature below the preset temperature, the temperature of the fluid reaching the sensing chamber 70 through port 72 will cause wax 90 in the thermostatic motor 80 to contract, thereby shortening the length of the thermostatic motor 80 and displacing the bumper 110 from the pilot bore 112. Correspondingly, the pressure in the reservoir chamber 46 will be reduced relative to the distribution chamber 68 and the diaphragm 50 displaced from the seat 42, permitting fluid flow through the shut-down valve 20. Accordingly, this variant of the pilot valve (bumper 110, pilot bore 112 and bumper spring 114) is a hot sensitive pilot valve.

Figure 6:
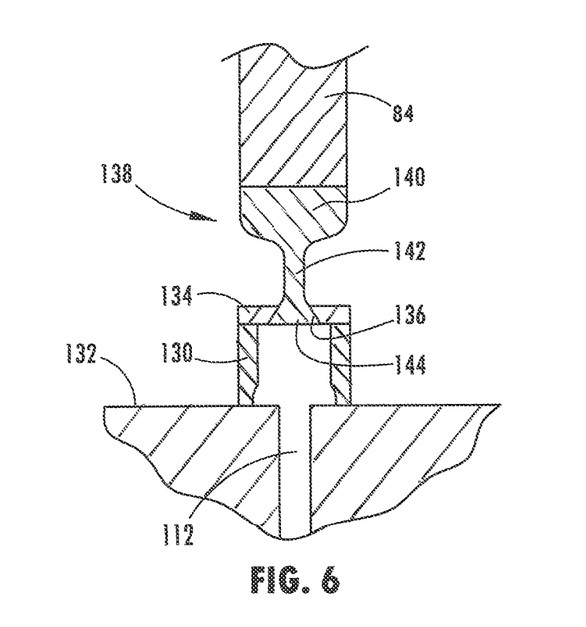
FIG. 6 is a diagrammatic cross-sectional illustration, similar to FIG. 7, showing the cold sensitive pilot valve in a closed position.

Referring now to FIGS. 5 and 6, the figures present a diagrammatic cross-sectional depiction of a cold sensitive pilot valve incorporated into the shut-down valve 20. Accordingly, the construction of the pilot valve herein replaces the bumper 110 and bumper spring 114 shown and described with the prior figures. Like the prior construction, the pilot valve of FIGS. 5 and 6 is cooperatively attached to an end of the thermostatic motor 80, such as an end of the motor body 84.

As seen in FIG. 5, the construction of the pilot valve therein allows pilot fluid flow through the pilot valve in the normal open condition when the fluid is not excessively cold. As seen therein a pilot cylinder 130 is fixedly attached to the pilot floor 132 around the entrance to the pilot bore 112. An end wall 134 attached to the top of the cylinder 130 includes a tapered bore 136 therethrough.

A pilot valve plug 138, preferably made of flexible, resilient material, is fixedly attached to the end of the motor body 84. The plug 138 is comprised of a plug base 140, a plug stem 142, and plug valve 144. The plug stem 142 extends from the plug base 140 through the bore 136 of the end wall 134. The plug valve 144 is formed as conical valve on the other end of the plug stem 142.

When the pilot fluid flow is not excessively cold, the flow of the pilot fluid through the pilot fluid passage 112 is unobstructed, fluid pressure in the reservoir chamber 46 does not increase, the diaphragm 50 does not engage the valve seat 42, and flow through the shut-down valve 20 is unobstructed.

However, in response to excessively cold fluid, the thermostatic motor 80 and pilot valve of FIGS. 5 and 6 operate to stop the flow of pilot fluid therethrough. When the flow of fluid through the shut-down valve 20 of FIGS. 5 and 6 is excessively cold, the thermostatic motor 80 contracts causing upward movement of the pilot valve plug 138. With sealing interaction of the plug valve 144 with bore 136 of the end wall 134, the bore 136 is closed, preventing the flow of fluid through the bore 136 into the pilot bore 112. Such obstruction of the pilot bore 112 causes an increase in fluid pressure in the reservoir chamber 46 and the downward flexation of the diaphragm 50, which engages the valve seat 42 closing the primary valve 48 and preventing passage of fluid through the shut-down valve 20.

Figure 7:
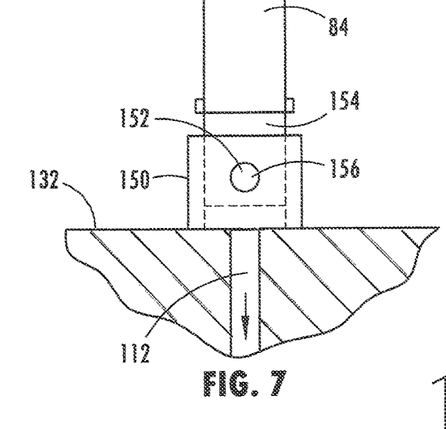
FIG. 7 is a diagrammatic cross-sectional illustration of a combination pilot valve showing the valve in an open position.
Figure 8:
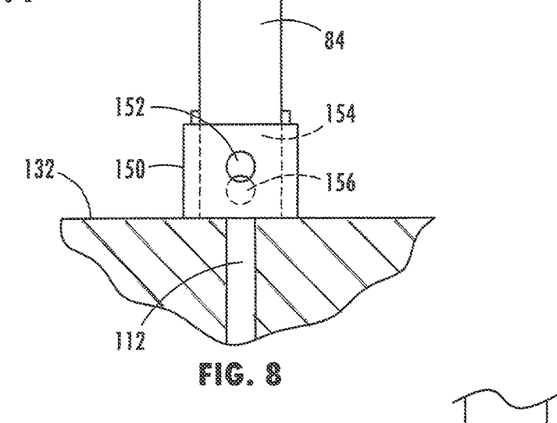
FIG. 8 is a diagrammatic cross-sectional illustration, similar to that of FIG. 7, showing the combination pilot valve in a closed position in response to excessively hot fluid in the shut-down valve.
Figure 9:
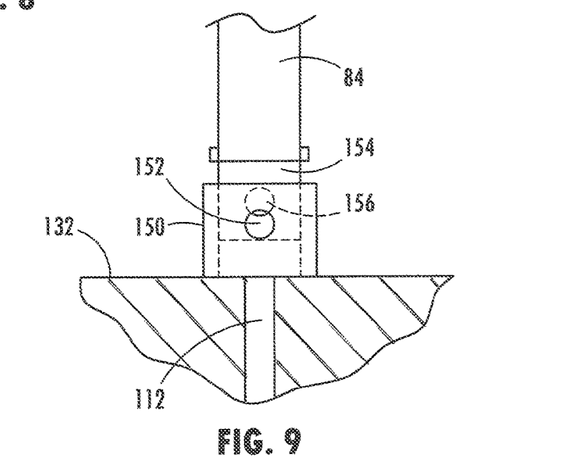
FIG. 9 is a diagrammatic cross-sectional illustration, similar to that of FIG. 7, showing the combination pilot valve in a closed position in response to excessively cold fluid in the shut-down valve.

FIGS. 7, 8 and 9 are diagrammatic depiction of a pilot valve variation that is hot and cold sensitive. Accordingly, the normal open condition of this variant is one in which the fluid is not excessively hot and is not excessively cold.

As seen in FIG. 7, a pilot cylinder 150 is fixedly attached to the pilot floor 132 around the entrance to the pilot bore 112. The pilot cylinder 150 has an open upper end and is provided with one or more side bores 152 in the wall of the pilot cylinder 150.

A hollow, cylindrical pilot valve extension 154 is provide on the lower end of the motor body 84 and protrudes into the pilot cylinder 150 through its open top. The outer surface of the pilot valve extension 154 has a diameter such that it is in a substantially sealing relationship with inner surface of the valve cylinder 150. The cylindrical pilot valve extension 154 is further provided with one or more side bores 156 that are arranged so as to be capable of alignment with the side bores 152 of the pilot cylinder 150.

When the temperature of the fluid in sensing chamber 70 is not excessively hot or cold, the thermostatic motor 80 is configured so that its length positions pilot valve extension 154 relative to the pilot cylinder 150 with the side bores 152, 156 of each in alignment with one another. With this alignment, the pilot valve is open and fluid flows through in through the side bores 152, 156, into the hollow interior of the pilot valve extension 154 and subsequently through the pilot bore 112. In this position, the pressure in the reservoir chamber 46 does not increase, the diaphragm 50 remains disengaged from the valve seat 42 and flow through the shut-down valve 20 is unobstructed.

The effect of excessively hot fluid through the pilot valve variant of FIG. 7 is seen in FIG. 8. As shown therein, the excessively hot fluid has caused expansion of the thermostatic motor 80 and downward movement of pilot valve extension 154, moving the side bore 156 out of alignment with the side bore 152 of the pilot cylinder 150. This displacement of the side bores 152 and 156 thereby prevents most of the fluid flow into the pilot bore 112. This obstruction of the pilot bore 112 in turn causes an increase in fluid pressure in the reservoir chamber 46 and the downward flexation of the diaphragm 50 into engagement with the valve seat 42. The closing of the primary valve 48 accordingly prevents the passage of fluid through the shut-down valve 20.

The effect of excessively cold fluid through the pilot valve variant of FIG. 7 is shown in FIG. 9. As seen in FIG. 9, excessively cold fluid causes contraction of the thermostatic motor 80 and upward movement of pilot valve extension 154. This upward movement accordingly moves the side bore 156 out of alignment with the side bore 152 of the pilot cylinder 150. With this displacement of the side bores 152 and 156, most of the fluid flow into the pilot bore 112 is prevented, and the obstruction causes an increase in fluid pressure in the reservoir chamber 46. With increased pressure in the reservoir chamber 46, the diaphragm 50 is cause to flex downward into engagement with the valve seat 42, closing of the primary valve 48 and preventing the passage of fluid through the shut-down valve 20.

It is noted that in all variants described herein, it is preferred that the flow of fluid into the pilot bore 112 is not be completely stopped in reaction to excessively hot or cold fluid. This continued residual fluid flow through the sensing chamber 70 allows the shut-down valve 20 to continually monitor the temperature of the fluid at the inlet bore 38 in order to allow unrestricted flow through the shut-down valve 20 when the correct temperature of the fluid is restored.

The valve base, cover, motor body, motor body, motor stem and associated components are preferably manufactured of suitable hard, non-porous, strong materials, such as bronze, steel, stainless steel, and iron. The wax of the thermostatic motor is preferably a paraffin wax with molecules of a narrow range of carbon chain lengths, allowing expansion and retraction of the thermostatic motor/element stem within a predetermined temperature range. The diaphragm is preferably made of suitable flexible water resistant material, such as rubber or plastics. Suitable materials include natural rubber, polypropylene, polyethylene, polyvinylidene fluoride, nitrile rubber, ethylene propylene diene monomer rubber, butyl rubber, vinylidene fluoride monomer fluoroelastomers, silicone rubber, fluorinated ethylene propylene, perfluoroalkoxy, and polytetrafluoroethylene.

While a number of exemplary constructions have been discussed above, those skilled in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

We claim:

1. A mechanical shut-down valve assembly comprising:
    a valve body having a bore extending from an inlet to an outlet through which fluid may flow;
    a main valve located in the bore, the main valve comprising a valve wall defining a valve seat and a valve member, the valve member moveable between a closed position in engagement with the valve seat and preventing flow through the bore and an open position in disengagement with the valve seat and permitting flow through the bore;
    a reservoir chamber provided in the valve body and being partially defined by the valve member;

a thermostatic motor assembly coupled to the valve body, the thermostatic motor assembly including a motor housing defining a sensing chamber and a thermostatic motor located in the sensing chamber, the sensing chamber being in fluid communication with the reservoir chamber and the thermostatic motor being configured to axially change in length in response to temperature changes in the sensing chamber;

a pilot valve defining a variable-size orifice in a fluid pathway communicating the reservoir chamber with the bore, the pilot valve being moveable between defining a fully closed position and a fully open position of the variable-sized orifice, the pilot valve being operatively coupled to the thermostatic motor whereby the variable-size orifice is varied in size in response to temperature changes in the sensing chamber; and wherein when the variable-size orifice is in the fully closed position, an increase in fluid pressure is effectuated in the reservoir chamber causing movement of the valve member into the closed position.

2. The mechanical shut-down valve according to claim 1, wherein the valve member is a flexible diaphragm.

3. The mechanical shut-down valve according to claim 1, further comprising a bleed orifice providing fluid communication from the bore into the reservoir chamber.

4. The mechanical shut-down valve according to claim 3, wherein the bleed orifice in unobstructed.

5. The mechanical shut-down valve according to claim 3, wherein the bleed orifice is provided through the valve member.

6. The mechanical shut-down valve according to claim 1, wherein the sensing chamber is in open fluid communication with the reservoir chamber.

7. The mechanical shut-down valve according to claim 1, wherein the pilot valve is cooperatively defined by portions attached to the thermostatic motor assembly and portions of the valve body.

8. The mechanical shut-down valve according to claim 7, wherein the portions of the valve body define a valve seat.

9. The mechanical shut-down valve according to claim 7, wherein the portions attached to the thermostatic motor assembly include a bumper moveable with the thermostatic motor assembly.

10. The mechanical shut-down valve according to claim 1, wherein the valve wall is defined by the valve body.

11. The mechanical shut-down valve according to claim 1, wherein the bore includes an inlet portion on a side of the main valve communicating with the inlet and includes an outlet portion on an opposing side of the main valve communicating with the outlet.

12. The mechanical shut-down valve according to claim 11, wherein a valve orifice is defined centrally within the valve seat.

13. The mechanical shut-down valve according to claim 12, wherein the valve orifice is circumscribed by the inlet portion of the bore.

* * * * *